United States Patent [19]

Stahl et al.

[11] Patent Number: 5,358,119
[45] Date of Patent: Oct. 25, 1994

[54] METHOD OF SEPARATING A MIXTURE OF PLASTICS COMPRISING AT LEAST THREE COMPONENTS USING ELECTROSTATIC TECHNIQUES

[75] Inventors: Ingo Stahl, Vellmar; Axel Hollstein, Kassel; Ulrich Kleine-Kleffmann; Iring Geisler, both of Bad Hersfeld; Ulrich Neitzel, Kassel, all of Fed. Rep. of Germany

[73] Assignee: Kali und Salz Aktiengesellschaft, Kassel, Fed. Rep. of Germany

[21] Appl. No.: 39,273

[22] PCT Filed: Jul. 4, 1992

[86] PCT No.: PCT/EP92/01613

§ 371 Date: Apr. 9, 1993

§ 102(e) Date: Apr. 9, 1993

[87] PCT Pub. No.: WO93/03848

PCT Pub. Date: Mar. 4, 1993

[30] Foreign Application Priority Data

Aug. 21, 1991 [DE] Fed. Rep. of Germany ....... 4127572

[51] Int. Cl.⁵ .............................................. B07C 5/02
[52] U.S. Cl. .................................... 209/3.1; 209/173; 209/127.4; 209/11
[58] Field of Search ....................... 209/3, 173, 10, 11, 209/17, 127.4, 3.1

[56] References Cited

U.S. PATENT DOCUMENTS

| | | | |
|---|---|---|---|
| 3,143,492 | 8/1964 | Bullock | 209/127.4 |
| 4,119,533 | 10/1978 | Saitoh et al. | 209/173 X |
| 4,199,109 | 4/1980 | Watanabe . | |
| 4,529,506 | 7/1985 | Smit | 209/173 X |
| 4,557,827 | 12/1985 | Fricke et al. | 209/127.4 |
| 4,617,111 | 10/1986 | Grimm et al. | 209/173 X |
| 4,728,045 | 3/1988 | Tomaszek . | |
| 4,797,201 | 1/1989 | Küppers et al. | 209/127.4 |
| 4,830,188 | 5/1989 | Hannigan et al. | 209/173 X |
| 4,849,116 | 7/1989 | Weinmann et al. | 209/173 X |
| 4,944,868 | 7/1990 | Jay, Sr. et al. | 209/173 X |
| 5,115,987 | 5/1992 | Mithal | 209/173 X |
| 5,255,859 | 10/1993 | Peacock et al. | 209/173 X |

FOREIGN PATENT DOCUMENTS

| | | |
|---|---|---|
| 279200 | 8/1988 | European Pat. Off. . |
| 940341 | 2/1956 | Fed. Rep. of Germany . |
| 2101585 | 2/1973 | Fed. Rep. of Germany . |
| 136956 | 8/1979 | Fed. Rep. of Germany . |
| 3618058 | 2/1987 | Fed. Rep. of Germany . |
| 2078138 | 1/1992 | United Kingdom . |

OTHER PUBLICATIONS

Patent Abstracts of Japan, vol. 8, No. 138 (C-231) (1575), 27 Jun. 1984.

*Primary Examiner*—D. Glenn Dayoan
*Attorney, Agent, or Firm*—Collard & Roe

[57] ABSTRACT

Plastic mixtures are split up into the individual components by a process combining density separation with electrostatic separation, and includes a special surface treatment which takes place prior to the electrostatic separation.

20 Claims, 3 Drawing Sheets

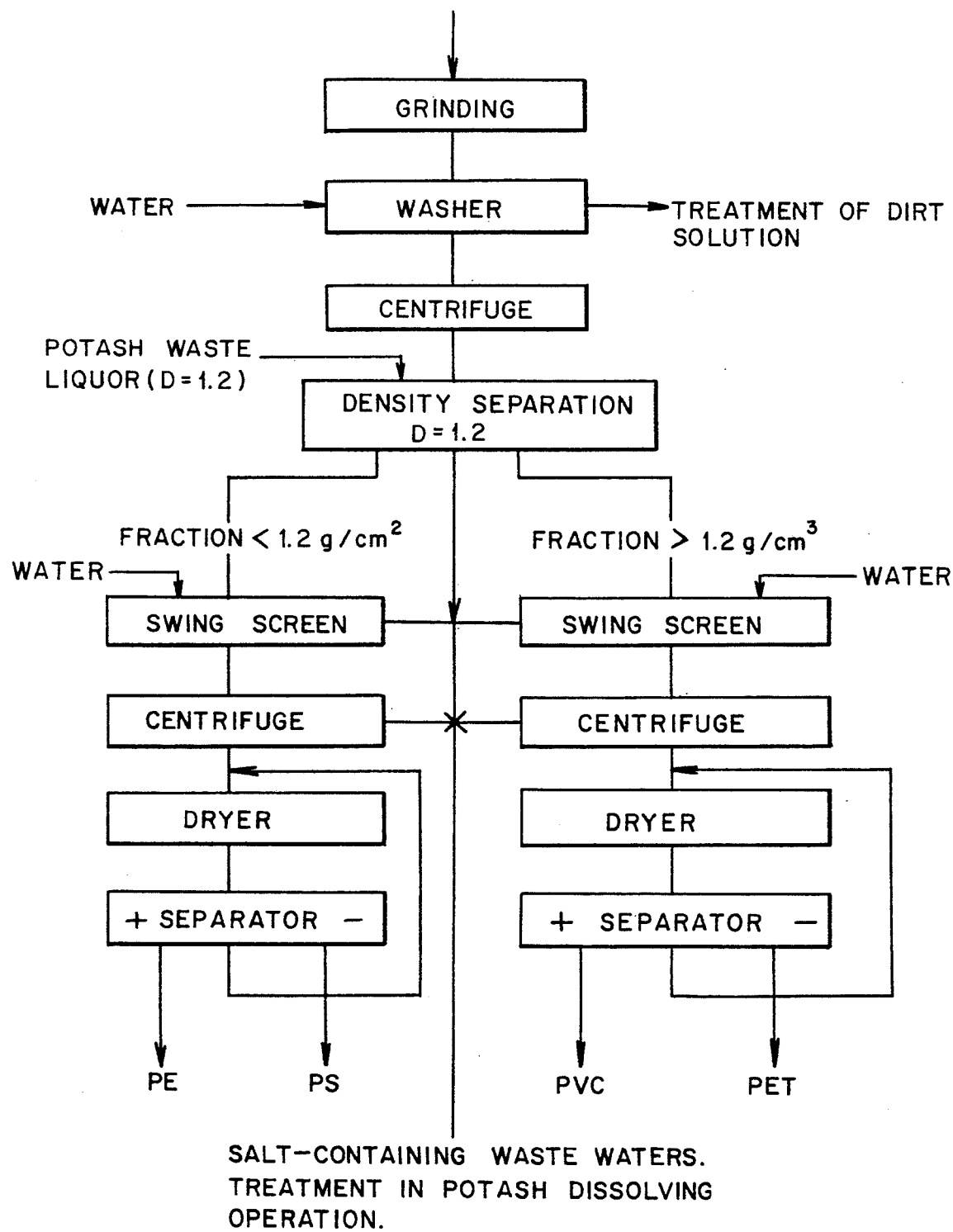

METHOD OF SEPARATING A MIXTURE OF PLASTICS COMPRISING AT LEAST THREE COMPONENTS USING ELECTROSTATIC TECHNIQUES

BACKGROUND OF THE INVENTION

1. Field of the Invention

The invention relates to a process for the separation of plastic particles of a plastic mixture of plastics of a chemically different type which partly have an overlapping and partly a different density range, e.g. polyethylene (PE), polyethylene terephthalate (PET), polypropylene (PP), polystyrene (PS), and polyvinyl chloride (PVC).

2. The Prior Art

Such different types of plastic occur as waste, for example when different one-way bottles are mixed. For example, still waters are predominantly filled in 1.5-liter PVC-bottles, whereas other beverages are sold in so-called PET-bottles. In Western Europe alone, 1.4 billion PET-bottles are manufactured annually. The bottles have, as a rule, a polyethylene screw cap, whereby the PET-bottles may have a bottom part made of polyethylene as well. Direct recycling of the mixed bottle plastics is not possible because PET melts only at 260° C., whereas PVC decomposes with separation of HCl already above the softening temperature of 160° C. There are, therefore, no appreciable recycling possibilities, so that the waste plastics have not been collected heretofore but eliminated via the household refuse, i.e., they are finally incinerated or deposited.

Furthermore, it is not possible, as a rule, to achieve any profits for mixed PVC-containing plastics. The fact is rather that the reuser frequently demands a credit that is oriented on the dumping costs saved.

As opposed to the above, there is a market for purely sorted recycling plastics since long, whereby the prices are oriented on the prices for new material. Up to 60% of the new material is achieved for recycling material depending on the quality. Thus there is much interest in processes for the separation of mixed plastics.

The processes known from the state of the art for the separation of plastic particles of plastics of a chemically different type operate with plants separating according to the density, for example hydrocyclones. Said process, however, fails in connection with plastics that are in the same density range such as, for example, PET (density about 1.37 to 1.38 $g/cm^3$) and PVC (density about 1.38 $g/cm^3$). However, the separation of polyethylene (PE) from the other two plastic types PET and PVC is possible because of the different density of 0.95 $g/cm^3$. The separation of plastics that are in the same density range can be carried out, for example electrostatically.

It is known from DE-PS 30 35 649 to separate plastics electrostatically in a free-fall separator.

However, it has been found that in the separation of a plastic mixture with three or four different types of plastics, thus for example PE, PET, PS and PVC with one of said processes, a large quantity of medium material is collected, or that the deposits on the respective electrode have only an insufficient degree of purity. Furthermore, the medium material has a high component of at least one of the plastics used.

SUMMARY OF THE INVENTION

The invention, therefore, has the object of creating a process of the type specified at the beginning in which several components of a plastic mixture even of similar or the same densities can be safely separated from one another. This object is achieved in that the separation takes place in at least two steps, whereby in a first step, the plastic particles having a different density range are separated from each other, and whereby in a second step, the plastic particles with the same density range are separated. In this connection, the plastic particles are advantageously separated in the first step according to the principle of density separation, whereby the density of the separation liquid is selected in such a way that it falls in the field of the greatest density difference between the individual plastic types of the plastic mixture; advantageously, the density of the separation liquid is adjusted in this connection between 1.0 and 1.3 $g/cm^3$. The density separation can take place in this connection by means of a hydrocyclone as well. If necessary, the separation according to the density takes place not only in one step but in several ones if several types of plastic with a different density are to be separated.

Furthermore, it has been found that it is possible to achieve through a surface treatment of the plastic particles of the plastic mixture an improved triboelectric charging in the sense of a higher charge density.

According to an advantageous feature of the invention, the chemical treatment of the surface of the plastic particles of the plastic mixture takes place in that the separation liquid is selected in such a way that it is in the basic range (pH about 10 to 12) or in the acid range (pH of 2 to 4). Particularly advantageous results are obtained if the separation liquid is a salt solution of which NaCl is the main component. In addition to the NaCl in the salt solution, K-, Mg- and $SO_4$-ions may be present in the salt solution as well, i.e., because of the desired composition of the salt solution it is possible to use a salt solution as formed as a waste product in the production of potash in potash mining. An enhanced triboelectric charging is particularly achieved also if, after the density separation, the separation liquid is washed out of the plastic mixture by water. In the course of density separation or of the subsequent cleaning of the plastic mixture with water, the plastic particles having a size of under 10 and preferably about under 6 mm can be cleaned from paper residues or beverage residues. However, such cleaning is possible also in a washing process carried out prior to the density separation, for example in a washing mill or in a turbo-washer. After the washing, a drying of the plastic mixture takes place, whereby prior to the actual drying, the water content of the plastic mixture is reduced by a dehydration aggregate, e.g. a centrifuge, to a residual water proportion of under 2%.

In the following, the plastic mixture is subjected to a thermal treatment at 30° to 100° C. over a time period of at least 5 minutes; this measure, too, serves for achieving a higher charge density of the individual plastic particles. This is seemingly explainable in that due to the thermal treatment in the aforementioned temperature range, a change occurs in the surface of the plastic particles. The surface treatment can be achieved both chemically and through heat, or through both types of treatment.

According to another advantageous feature of the invention, an organic substance, in particular fatty acid is added to the plastic mixture in an amount of about 10 to 50 mg/kg plastic mixture. The addition of fatty acid serves for the conditioning of the plastic particles, also with the objective of obtaining in the subsequent triboelectric charging a higher charge density of the individual particles. This treatment, too, can take place alone or in combination with the chemical or thermal treatment of the plastic particles.

It has been found that with plastic particles pretreated in said way, only field intensities of 2 to 3 KV/cm have to be maintained in the free-fall separator itself.

As opposed to the above, the free-fall separator operates in connection with the known process with a field intensity of 3 to 4 KV/cm, which posed the danger of spray discharges. Spray discharges may cause an ignition of the plastic mixture in the free-fall separator.

The triboelectric charging itself takes place, for example in a fluidized-bed dryer, or in a spiral worm of adequate length, or also by pneumatically conveying the plastic mixture over a certain distance. As marginal conditions it is necessary to maintain in the triboelectric charging temperatures of about 15° to 50° C., preferably 20° to 35° C., and a relative humidity of the ambient air of 10 to 40%, preferably 15 to 20%. The triboelectric charging of the plastic particles themselves takes place in the known way by intimately contacting of the particles with one another.

BRIEF DESCRIPTION OF THE DRAWINGS

FIG. 3 shows a flow diagram relating to Example 3.

The process according to the invention is explained on the basis of the following examples.

DETAILED DESCRIPTION OF THE PREFERRED EMBODIMENTS

Figure 1:
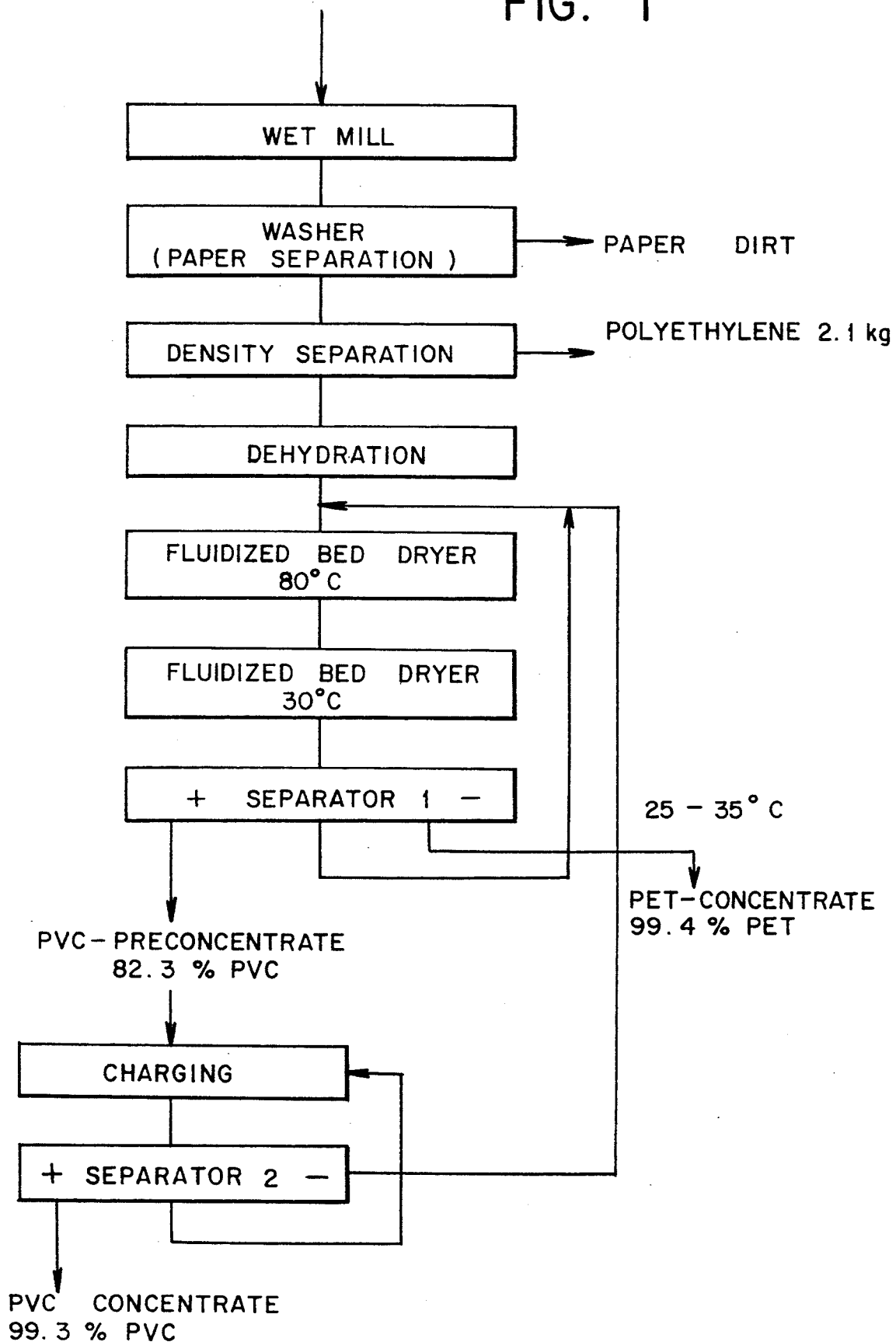
FIG. 1 shows a flow diagram relating to Example 1.

EXAMPLE 1:

Separation of a mixture of beverage bottles is shown in FIG. 1

The mixture of beverage bottles used had the following composition:
76.9% PET
19.8% PVC
2.1% PE
1.2% paper/dirt.

The bottle mixture was fed into a wet-operating cutting mill and, under addition of water, crushed to a particle size of under 6 mm. The dirt solution, which also contained paper, was drawn off. Subsequently, the material was vigorously stirred in a washer, which cleaned the surfaces and prepared the latter for the later electrostatic separation.

For separating the polyolefins (PE), the substances was admitted into a hydrocyclone. The resulting PVC-PET-mixture was separated from the liquid on a vibration screen, centrifuged, and dried for 6 minutes in a fluidized-bed dryer at 70° to 100° C.

In the fluidized bed, any last paper residues that might still be present can be discharged with the exhaust air and separated from the exhaust air by means of a cyclone. The predried material was subsequently contacted in another fluidized-bed dryer for another 3 minutes at 30° C. and at the same time charged.

The material draining from the fluidized bed was continuously admitted to a separating plant consisting of two separators. A PET-concentrate with 99.4% PET is obtained already in the preliminary separation; the PVC-concentrate with a PVC-content of 82.3% was conveyed to the after-separation separator by means of a spiral worm, whereby the selective charging of the plastic particles developed.

In the after-separation separator, the preconcentrate so charged was separated into a high-percent PVC-concentrate, a medium-material fraction, and a deconcentration fraction containing about 53% PET. The latter together with the medium material of the preseparation was recycled into the fluidized bed for new charging.

All in all, it was possible to separate the plastic mixture into
a PVC-fraction with a degree of purity of 99.3% PVC,
a PET-fraction with a degree of purity of 99.4% PET, and
a PE-fraction with a degree of purity of 97.6 PE;
the yield (absolute quantity)—based on the bottle mixture used—consisted of:
94.6% PET
96.2% PVC
89.7% PE.

Figure 2:
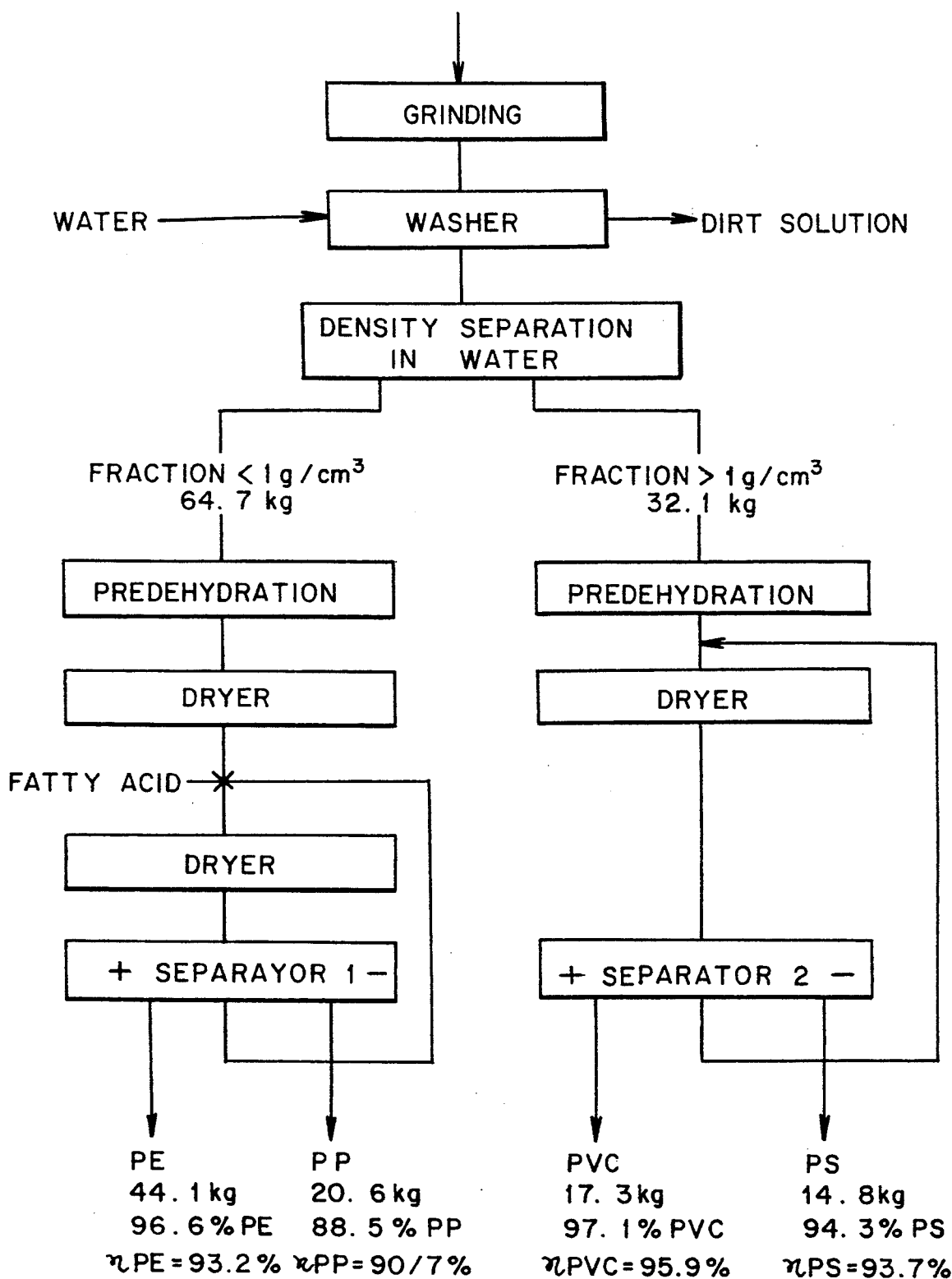
FIG. 2 shows a flow diagram relating to Example 2.

EXAMPLE 2:

Separation of a PE/PP/PS/PVC plastic mixture is shown in FIG. 2

The used mixture of used plastic articles contained four of the most commonly used mass plastics in the following composition:
45.7% PE
20.1% PP
17.5% PVC
14.9% PS
1.8% residual substances.

100 kg of said mixture was first completely crushed on a cutting mill to a grain size of under 6 mm. The shred mixture was fed into a washer and stirred with fresh water. The washed material was transferred into a flotation basin filled with water, whereas the dirt solution was discarded. The light fraction containing the polyolefins was skimmed off, whereas the heavy fraction containing the PVC and PS was sucked off at the bottom of the basin. Both fractions were predehydrated by means of centrifuging.

The PP/PE-fraction was fed into a fluidized-bed dryer and dried for 6 minutes at 80° C. A fatty acid mixture C8-C12 was sprayed onto the draining material in an amount of 50 g/t, and fluidizing was carried out in another fluidized-bed dryer for 3 minutes at 30° C. The mixture flowing from the fluidized bed was continuously fed into a free-fall separator. The medium material of said separation was continuously recycled into the second fluidized-bed dryer.

The electrostatic separation of the light fraction supplied the following result:

|  | Quantity kg | Analysis (degree of purity in %) | Yield (in % of the charge) |
| --- | --- | --- | --- |
| PE-fraction | 44.1 | 96.6 | 92.2 |
| PP-fraction | 20.6 | 88.5 | 90.7 |

The heavy fraction was transferred into a fluidized-bed dryer with a connected cooler, dried in the heating zone for about 6 minutes at 80° C., and fluidized in the cooling zone for about 3 minutes at 30° C. The electrostatic separation, with recycling of the medium material in this case too, supplied the following result:

|  | Quantity kg | Analysis (degree of purity in %) | Yield (in % of the charge) |
| --- | --- | --- | --- |
| PVC-fraction | 17.3 | 97.1 | 95.9 |
| PS-fraction | 14.8 | 94.3 | 93.7 |

EXAMPLE 3:

Separation of a PE/PS/PET/PVC-mixture into the individual components is shown in FIG. 3

The used mixture of used plastics had the following composition:
46.8% PE
29.8% PS
12.2% PVC
10.1% PET
1.1% dirt.

100 kg of said mixture was first completely crushed in a cutting mill to a grain size of under 6 mm. The shred mixture was fed into a washer and stirred with fresh water. The washed material was filled in a flotation basin filled with potash waste liquor with a density of 1.2 g/cm³.

The light fraction containing PE and PS was skimmed off, whereas the heavy fraction containing PVC and PET was sucked off at the bottom of the basin. Both fractions were predehydrated on a swing screen, washed with fresh water, and subsequently predehydrated on centrifuges to an adhering moisture of 2%. The salt-containing waste waters collected in the density separation and predehydration can be recycled into the potash dissolving operation for treatment. Both fractions were fed into separate fluidized-bed dryers equipped in each case with a heating and a cooling zone. In the hot zone, the materials were heated to 80° C., whereby the dwelling time came to about 6 minutes, whereas the cooling zone connected downstream was operated with unheated air.

The materials flowing from the fluidized beds were fed into electrostatic free-fall separators, whereby the collected medium materials were recycled into the fluidized beds.

The electrostatic separation of the light fraction supplied the following result:

|  | Quantity kg | Analysis (degree of purity in %) | Yield (in % of the charge) |
| --- | --- | --- | --- |
| PE-fraction | 43.8 | 95.6 | 93.5 |
| PS-fraction | 27.7 | 92.4 | 92.9 |

The following result was obtained in the electrostatic separation of the heavy fraction:

|  | Quantity kg | Analysis (degree of purity in %) | Yield (in % of the charge) |
| --- | --- | --- | --- |
| PVC-fraction | 12.6 | 93.9 | 96.6 |

-continued

|  | Quantity kg | Analysis (degree of purity in %) | Yield (in % of the charge) |
| --- | --- | --- | --- |
| PET-fraction | 9.2 | 97.1 | 88.0 |

We claim:

1. Process for the separation of crushed plastic particles of a plastic mixture of plastics of a chemically different type, which partly have an overlapping density range and partly a different density range selected from the group consisting of polyethylene (PE), polyethylene terephthalate (PET), polypropylene (PP), polystyrene (PS), and polyvinyl chloride (PVC), comprising the steps of
first separating the plastic particles having a different density range according to the principle of density separation; and
second separating the plastic particles with the same density range via a free-fall separator;
subjecting the plastic mixture to a surface treatment; and
triboelectric charging the plastic mixture.

2. Process according to claim 1, further comprising the step of providing a separation liquid;
wherein the density of the separation liquid is selected in such a way that the density is between the greatest density and the least density of the individual plastics.

3. Process according to claim 1, further comprising the steps of
washing the separation liquid out of the plastic mixture by water after the first step of density separation.

4. Process according to claim 3, further comprising the steps of
reducing the plastic mixture by a dehydration aggregate, to a residual water proportion of under 2%: and
drying the plastic mixture after the washing.

5. Process according to claim 4 further comprising the steps of
subjecting the dried plastic mixture to a thermal treatment at 70° to 100° C. over a time period of at least 5 minutes.

6. Process according to claim 2, further comprising adjusting the density of the separation liquid to values between 1.0 and 1.3 g/cm³.

7. Process according to claim 1, comprising triboelectric charging of the plastic mixture at a temperature of 15° to 50° C., and at a relative humidity of the ambient air of 10 to 40.

8. Process according to claim 1, comprising triboelectric charging the plastic mixture by loading in a fluidized-bed dryer.

9. Process according to claim 1, further comprising passing the plastic mixture through a spiral worm of sufficient length.

10. Process according to claim 1, further comprising conveying the plastic mixture pneumatically over a specified distance.

11. Process according to claim 1, further comprising operating the free-fall separator at a field intensity of 2 to 3 KV/cm.

12. Process according to claim 7, wherein the triboelectric charging of the plastic mixture occurs at a temperature of 20° C. to 35° C. and at a relative humidity of the ambient air of 15% to 20%.

13. Process for the separation of plastic particles of a plastic mixture of plastics of a chemically different type, which partly have an overlapping density range and partly a different density range, selected from the group consisting of polyethylene (PE), polyethylene terephthalate (PET), polypropylene (PP), polystyrene (PS), and polyvinyl chloride (PVC), comprising in a first step, the plastic particles having a different density range are separated from one another according to the principle of density Separation and;

in a second step, the plastic particles with the same density range are separated, wherein the density of a separation liquid is selected in such a way that the density is between the greatest density and the least density of the individual plastics, and wherein the separation liquid is selected in such a way that it is either in the basic range having pH about 11 to 12 or in the acid range having pH about 2 to 4.

14. Process according to claim 13, wherein the separation liquid is a salt solution of which the main component is NaCl.

15. Process according to claim 14, wherein K-, Mg- and SO$_4$-ions are additionally present.

16. Process for the separation of plastic particles of a plastic mixture of plastics of a chemically different type, which partly have an overlapping density range and partly a different density range, selected from the group consisting of polyethylene (PE), polyethylene terephthalate (PET), polypropylene (PP), polystyrene (PS), and polyvinyl chloride (PVC), comprising in a first step, the plastic particles having a different density range are separated from one another according to the principle of density separation;

in a second step, the plastic particles with the same density range are separated;

washing the separation liquid out of the plastic mixture by water after the first step of density separation;

reducing the plastic mixture by a dehydration aggregate to a residual water proportion of under 2% prior to drying;

drying the plastic mixture after washing; and adding an organic substance to the plastic mixture.

17. Process according to claim 16, wherein the organic substance is a fatty acid.

18. Process according to claim 17, further comprising adding the fatty acid in an amount of 10 to 50 mg/kg plastic mixture.

19. Process according to claim 16, wherein the plastic particles of the plastic mixture have a size of under 10 mm.

20. Process according to claim 19, wherein the plastic particles of the plastic mixture have a size under 6 mm.

* * * * *